(12) United States Patent
Volle et al.

(10) Patent No.: US 8,063,157 B2
(45) Date of Patent: Nov. 22, 2011

(54) CURING AGENTS FOR EPOXY RESINS

(75) Inventors: Jörg Volle, Selm-Bork (DE); Michael Vogel, Efringen-Kirchen (DE)

(73) Assignee: Huntsman Advanced Materials Americas LLC, The Woodlands, TX (US)

( * ) Notice: Subject to any disclaimer, the term of this patent is extended or adjusted under 35 U.S.C. 154(b) by 797 days.

(21) Appl. No.: 11/630,500

(22) PCT Filed: Jun. 20, 2005

(86) PCT No.: PCT/EP2005/052855
§ 371 (c)(1),
(2), (4) Date: Oct. 24, 2007

(87) PCT Pub. No.: WO2005/123800
PCT Pub. Date: Dec. 29, 2005

(65) Prior Publication Data
US 2009/0264593 A1   Oct. 22, 2009

(30) Foreign Application Priority Data
Jun. 21, 2004  (DE) .................. 10 2004 029 922

(51) Int. Cl.
*C08G 59/00* (2006.01)
*C08G 59/18* (2006.01)
*C08G 59/56* (2006.01)
*C08L 63/00* (2006.01)

(52) U.S. Cl. ......... 525/523; 523/427; 523/428; 525/529
(58) Field of Classification Search ................ 523/427, 523/428; 525/523, 529
See application file for complete search history.

(56) References Cited

U.S. PATENT DOCUMENTS

| 6,562,934 B2 | 5/2003 | Yonehama et al. |
| 6,908,982 B2 | 6/2005 | Ichikawa et al. |

FOREIGN PATENT DOCUMENTS

| EP | 1188740 | | 3/2002 |
| EP | 1375554 | | 1/2004 |
| JP | 4045124 | | 2/1992 |
| JP | 2004-018711 | * | 1/2004 |
| SU | 976983 | | 11/1982 |

* cited by examiner

*Primary Examiner* — Ana Woodward

(57) ABSTRACT

Curing agent for epoxy resins, consisting of A) 1%-99% by weight of an adduct obtainable by reacting a1) a polyethylene polyamine having up to six nitrogens in the molecule with a2) a monoglycidyl ether, the adduct of a1) and a2) preferably being isolated by removal of the excess polyethylene polyamine, and B) 99%-1% by weight of an adduct obtainable by reacting b1) a diamine or polyamine with b2) styrene, and also curable compositions further comprising an epoxide compound, and the use of these curable compositions for producing moldings and sheetlike structures, and also for applications in the adhesives and sealants sector and for epoxy-resin mortars.

7 Claims, No Drawings

CURING AGENTS FOR EPOXY RESINS

CROSS REFERENCE TO RELATED APPLICATIONS

This application is the National Phase of International Application PCT/EP2005/052855 filed Jun. 20, 2005 which designated the U.S. and which claims priority to German (DE) Pat. App. No. 102004029922.6 filed Jun. 21, 2004. The noted applications are incorporated herein by reference.

The invention relates to curing agents for epoxy resins, consisting of
A) an adduct obtainable by reacting a1) a polyethylene polyamine having up to six nitrogens in the molecule, and a2) a monoglycidyl ether, and
B) an adduct of b1) a diamine or polyamine and b2) styrene, and to curable compositions further comprising an epoxide compound.

The use of these curable compositions for producing mouldings and sheetlike structures, and also for applications in the adhesives and sealants sector and for epoxy-resin mortars, is likewise provided by this invention.

Curable compositions based on aminic curing agents and epoxy resins are widely used in industry for the coating and finishing of metallic and mineral substrates, as adhesives and sealants, as matrix resins, as tooling resins or, very generally, as casting resins for producing mouldings or sheetlike structures.

Aminic curing agents used are, in particular, aliphatic, cycloaliphatic or aromatic amines. The mechanical and physical properties of the curable or cured compositions based on these amines are sufficient for many applications. In many cases in practice, however, these products have disadvantages, such as poor surfaces or severe formation of hydrates, for example. These surface defects, however, are not just a visual disruption, as in the case of a topcoat material, for example. The surface defects, particularly the formation of hydrates, may result in a situation in which, when the curing agent has to be overcoated, such as when used as a primer, for example, the inter-coat adhesion is not sufficient, and the subsequently applied topcoat material undergoes redetachment. For this reason it is preferred to use amine compounds which have a low free amine content. In these cases use is frequently made of preadducts of such amines with epoxy resins. The advantages, besides improved surface properties, are a lower vapour pressure and hence also reduced odour nuisance and toxicology. Since, however, the free amine content of such compounds is always still very high, use is sometimes made of what are known as "isolated adducts". In this case the excess free amine is separated off by distillation. The disadvantage of these compounds, however, is their viscosity, which is too high. In order to be able to be processed at room temperature and lower temperatures, it is necessary to add relatively large fractions of diluents. That, however, leads to a distinct impairment in the mechanical properties of the cured thermoset. The addition of diluents additionally leads, as a result of emissions, to a severe odour nuisance. In some cases these solvents are hazardous to health or toxic. The pollution of the environment by the outgassing solvents is enormous. Solvent which is present, especially during the application of thick layers, likewise gives rise, technically, to problems; for example, in the case of primers, remanence of solvent in the coating is disruptive and unwanted.

It was therefore an object of the invention to provide hardeners for curable compositions based on epoxy resins, having a comparatively low free amine content, but being simultaneously of low viscosity at room temperature and being processable without the addition of non-reactive diluents or solvents, and having surface properties and mechanical data of the cured thermosets that are at a high level.

This object is achieved in accordance with the invention by the curing agents of the invention for epoxy resins, consisting of
A) 1%-99%, preferably 10%-90%, more preferably 30%-70% by weight of an adduct obtainable by reacting a1) a polyethylene polyamine having up to six nitrogens in the molecule with a2) a monoglycidyl ether, the adduct of a1) and a2) preferably being isolated by removal of the excess polyethylene polyamine, and
B) 99%-1%, preferably 90%-10%, more preferably 70%-30% by weight of an adduct obtainable by reacting b1) a diamine or polyamine with b2) styrene.

The curing agents of the invention have comparatively low viscosities and enable processing at room temperature, so that there is no need to add disruptive solvents and/or plasticizers. The free amine content of these adducts is low.

In comparison to commercial hardeners an approximately comparable processing life (pot life) is combined, surprisingly, with observation of a much quicker cure rate, in particular at low temperatures (10° C.). This was not foreseeable. Instead, for approximately the same processing life, the expectation would have been of a comparable cure rate, since normally the processing life is dependent on the cure rate.

Adduct components a2) used for preparing the polyamine adducts A) include monofunctional, preferably aromatic, glycidyl ethers, such as phenyl glycidyl ether, cresyl glycidyl ether, glycidyl ethers based on distilled cashew nut oil, glycidyl ethers based on monoalcohols, styrene oxide, etc. Preference is given to using phenyl glycidyl ether and cresyl glycidyl ether.

As amine compounds a1) use is made of polyethylene polyamines which have not more than 6, preferably not more than 5, more preferably 2 to 4, nitrogen atoms in the molecule. Preference is given to polyethylene polyamines, such as aminoethylpiperazine, ethylenediamine, diethylenetriamine or triethylenetetramine, for example. Of particular preference the compound a1) is selected from ethylenediamine and/or diethylenetriamine.

To prepare the isolated polyamine adducts A) the epoxide compound is added to an excess of the amine component at 60° C. to 80° C. with stirring and, after reaction has taken place, the excess of the amine compound is separated off by distillation, under reduced pressure where appropriate.

The level of adducting is chosen in accordance with the invention such that there are 0.1 to 2.5 mol, preferably 0.5 to 2 mol, of styrene per mole of the amine compound.

Amines b1) which can be used include in principle all amines which have at least two reactive amine hydrogen atoms, examples being heterocyclic amines such as piperazine, N-aminoethylpiperazine; cycloaliphatic amines such as isophoronediamine, 1,2-1,3; 1,4)-diaminocyclohexane, aminopropylcyclohexylamine, tricyclododecanediamine (TCD); araliphatic amines, such as xylylenediamine; aliphatic, optionally substituted amines such as ethylenediamine, propylenediamine, hexamethylenediamine, 2,2,4(2,4,4)-trimethylhexamethylenediamine, 2-methylpentamethylenediamine; ether amine such as 1,7 diamino-4-oxaheptane, 1,10-diamino-4,7-dioxadecane, 1,14-diamino-4,7,10-trioxatetradecane, 1,20-diamino-4,17-dioxaeicosane and, in particular, 1,12-diamino-4,9-dioxadodecane. Use may also be made of the ether diamines based on propoxylated diols, triols and polyols ("Jeffamine®" from Huntsman). Additionally it is possible to use polyalkylene polyamines such as diethylenetriamine, triethylenetetramine, dipropylenetriamine, tripropylenetetramine and also high molecular weight amines or adducts or condensates that contain free amine hydrogen.

Preference is given to using xylylenediamine and/or trimethylhexamethylenediamine.

Of particular preference the adduct B) is a xylylenediamine-styrene adduct.

Adducts B) of this kind are available from Mitsubishi Gas Chemicals under the trade name Gaskamine™. Gaskamine 240 is used with preference. This is an adduct of xylylenediamine and styrene. The amine equivalent is 102 and the viscosity at 25° C. is approximately 65 mPa·s.

The invention additionally provides a curable composition characterized in that it comprises a curable epoxide compound, a curing agent of the invention, and optionally one or more auxiliaries and additives customary in epoxy resin technology.

The epoxide compounds also used in accordance with the invention for the curable compositions are commercially customary products having on average more than one epoxide group per molecule and derived from mono- and/or polyhydric and/or polynuclear phenols, especially bisphenols and also novolaks, such as bisphenol A diglycidyl ether and bisphenol F diglycidyl ether, for example. An extensive compilation of these epoxide compounds is found in the handbook "Epoxidverbindungen und Epoxidharze" by A. M. Paquin, Springer Verlag Berlin, 1958, chapter IV, and also in Lee & Neville, "Handbook of Epoxy Resins", 1967, Chapter 2.

Compositions of two or more epoxide compounds can also be used.

Preference is given in accordance with the invention to compositions of glycidyl ethers based on bisphenol A, bisphenol F or novolaks with what are called reactive diluents, such as monoglycidyl ethers of phenols or glycidyl ethers based on mono- or polyhydric aliphatic or cyloaliphatic alcohols, for example. Examples of such reactive diluents include phenyl glycidyl ether, cresyl glycidyl ether, p-tert-butyl phenyl glycidyl ether, butyl glycidyl ether, $C_{12}$-$C_{14}$ alcohol glycidyl ether, butane diglycidyl ether, hexane diglycidyl ether, cyclohexanedimethyl diglycidyl ether or glycidyl ethers based on polyethylene glycols or polypropylene glycols. If necessary the viscosity of the epoxy resins can be reduced further by adding these reactive diluents.

The mixing ratio of curing agent of the invention to epoxy resin is preferably chosen equivalently; that is, one epoxide equivalent is used for each amine equivalent. Depending on the intended use and desired end properties of the cured thermoset, however, it is possible to employ a superstoichiometic or substoichiometric amount of the hardener component.

This invention provides in one instance for the use of the curable compositions of the invention for producing mouldings and sheetlike structures, and also for applications in the adhesives and sealants sector and for epoxy-resin mortars.

The invention further provides the cured products obtainable by curing such a composition. The epoxy resins also used can be cured hot and cold (room temperature) with the curing agents of the invention.

The epoxy resins can be cured in the presence of further adjuvants, such as auxiliaries and additives that are customary in epoxy resin technology. Examples that may be mentioned include gravel, sands, silicates, graphite, silicon dioxide, talc, mica, and so on, in the particle-size distributions that are customary in this area. In addition it is possible to use pigments, dyes, stabilizers, flow control agents, plasticizing agents, non-reactive extender resins, plasticizers and accelerators.

The curable compositions may further comprise the curing agents that are customary in epoxy resin technology, especially aminic curing agents, as co-hardeners.

The compositions of the invention can be used very generally as casting resins for producing cured products, and can be used in the formulation that is appropriate to the particular end use, for example, as adhesives, as matrix resins, as tooling resins or as coating materials.

EXAMPLES

The reported viscosity values each at 25° C. were determined using a Haake VT 550 rotational viscometer in accordance with the manufacturers specifications.

Example 1

Preparation of an Isolated Adduct A)

309 g of diethylenetriamine (3 mol) are charged to a reaction vessel. After this initial charge has been heated to about 60° C., 185 g of cresyl glycidyl ether (1 epoxide equivalent) are added over the course of about 60 minutes. The temperature rises to 90° C. Subsequently the reaction product is heated to 260° C. and the excess amine is separated off under reduced pressure (<1 mbar). Distillate: 206 g (2 mol of DETA). Viscosity: 8500 mPa·s. Theoretical amine equivalent: about 72.

Example 2

Hardener Formulation Comprising A) and B)

500 g of the adduct from Example 1 and 500 g of the xylylenediamine-styrene adduct Gaskamine 240 are homogenized at 60° C. to 70° C.

Viscosity: 600 mPa·s. Theoretical amine equivalent: about 85.

Example 3

Hardener Formulation Comprising A) and B)

350 g of the adduct from Example 1 and 650 g of the xylylenediamine-styrene adduct Gaskamine 240 are homogenized at 60° C. to 70° C.

Viscosity: 350 mPa·s. Theoretical amine equivalent: about 89.

Use Examples: Cure Rate and Processing Life (Pot Life)

| Shore hardness D at 10° C. with the epoxy resin Araldite GY 783 [1] | | | |
|---|---|---|---|
| Hardener | MR [2] | Shore D after hours at 10° C. 24 h/48 h/72 h | Gel time |
| Example 2 | 45 | 71/76/80 | 52 min. |
| Example 3 | 47 | 50/73/79 | 82 min. |
| Aradur 46 [3] | 50 | 15/62/72 | 42 min. |
| Aradur 3278 [4] | 50 | n.m./35/66 | 80 min. |

[1] Araldite GY 783 is a bisphenol A/bisphenol F resin mixture modified with C12/C14 glycidyl ether and having a viscosity of about 1000 mPa · s (23° C.) and an epoxide equivalent weight of about 190;
[2] MR = Mixing ratio = grams of hardener per 100 grams of Araldite GY 783;
[3] Plasticized polyamine adduct. Standard hardener for coatings and floor coverings (from Huntsman);
[4] Plasticizer-free and solvent-free polyaminoamide hardener (from Huntsman);
[5] n.m. = not measurable Discussion of Results:

The cure rates of the curable compositions of the invention are very high at 10° C., while the processing lives are comparatively long. In direct comparison between the inventive examples and the comparative example as represented by Aradur 46, in fact, a much quicker cure with a much longer pot life is apparent. The comparison of Example 3 with Aradur 3278 shows a much quicker initial cure for a comparable pot life. Cure performance of this kind is desirable in practice, since on the one hand the processor has sufficient time to apply the curable mixture while on the other hand, in the coating sector for example, the coating can be accessed or worked on very rapidly. This result could not have been foreseen. Instead the expectation would have been that a relatively long processing life would be accompanied also by a slower cure rate.

Besides the outstanding cure rate in conjunction with comparatively long pot life, it was possible to observe a very good level in terms of the surface quality.

In this context mention may be made in particular of the resistance to texturing/hydrate formation, since these features, besides the necessary moisture compatibility, also play an important part in respect of intercoat adhesion.

The invention claimed is:

1. Curing agent for epoxy resins, consisting of
   A) 10%-90% by weight of an adduct obtained by reacting
      a1) a polyethylene polyamine having up to six nitrogens in the molecule with a2) an aromatic monoglycidyl ether and wherein the adduct A) is isolated by removal of excess polyethylene polyamine, and
   B) 90%-10% by weight of an adduct obtained by reacting
      b1) an aliphatic amine which has at least two reactive amine hydrogen atoms with b2) styrene.
2. Curing agent according to claim 1, characterized in that a2) is phenyl glycidyl ether or cresyl glycidyl ether.
3. Curing agent according to claim 1, characterized in that for the formation of the adduct B) there are 0.1 to 2.5 equivalents of component b2) per mole of component b1).
4. Curing agent according to claim 1, characterized in that the amine compound b1) trimethylhexamethylenediamine.
5. Curable composition, characterized in that it comprises a curable epoxide compound, and a curing agent according to claim 1.
6. Curable composition according to claim 5, characterized in that the epoxy resin is a bisphenol glycidyl ether or epoxy novolak and is diluted with a reactive diluent.
7. Cured product obtained by curing a composition according to claim 5.

* * * * *